235-379 SR

5/26/81 OR 4,270,042

United States Patent [19]

Case

[11] 4,270,042

[45] May 26, 1981

[54] ELECTRONIC FUNDS TRANSFER SYSTEM

[76] Inventor: John M. Case, 35 Lehigh Rd., Wellesley, Mass. 02181

[21] Appl. No.: 924,200

[22] Filed: Jul. 13, 1978

Related U.S. Application Data

[63] Continuation-in-part of Ser. No. 820,633, Aug. 1, 1977, abandoned.

[51] Int. Cl.[3] ...................... G06F 15/30; G06K 19/06

[52] U.S. Cl. ...................................... 235/379; 235/494

[58] Field of Search .............. 235/419, 425, 379, 380; 340/149 A

[56] References Cited

U.S. PATENT DOCUMENTS

| | | | |
|---|---|---|---|
| 3,086,706 | 4/1963 | Einsele | 235/419 |
| 3,347,367 | 10/1967 | Smith | 235/425 |
| 3,988,571 | 10/1976 | Blair et al. | 235/379 |
| 4,027,142 | 5/1977 | Paup et al. | 235/379 |
| 4,065,662 | 12/1977 | Garczynski et al. | 235/419 |

*Primary Examiner*—Daryl W. Cook

[57] ABSTRACT

An Electronic Funds Transfer (EFT) system comprising a number of uniquely designed instruments including a letter of credit card from which, at the time of each negotiation thereunder, data can be derived which, with a high degree of certainty, identifies the card holder the amount available for the transaction and such additional data as is required to complete, at the time of the transaction, a uniquely designed draft form to include all of the data needed to transfer the funds involved between the proper parties to the transaction on a purely EFT basis. The system includes a sorter which, responsive to a uniquely located punch-out on the draft, feeds the draft to a transmitter for automatic transmission of all its significant data through a clearing house to the proper issuer who completes a uniquely designed debit ticket from the received data and, by means of a uniquely located punch-out on the ticket, effectuates an automatic machine clearance of the transaction through the letter of credit account on the books of the issuer and final charge to the holder's account. The system may be adopted to handle additional types of fund transfer transactions.

3 Claims, 8 Drawing Figures

FIG. 1
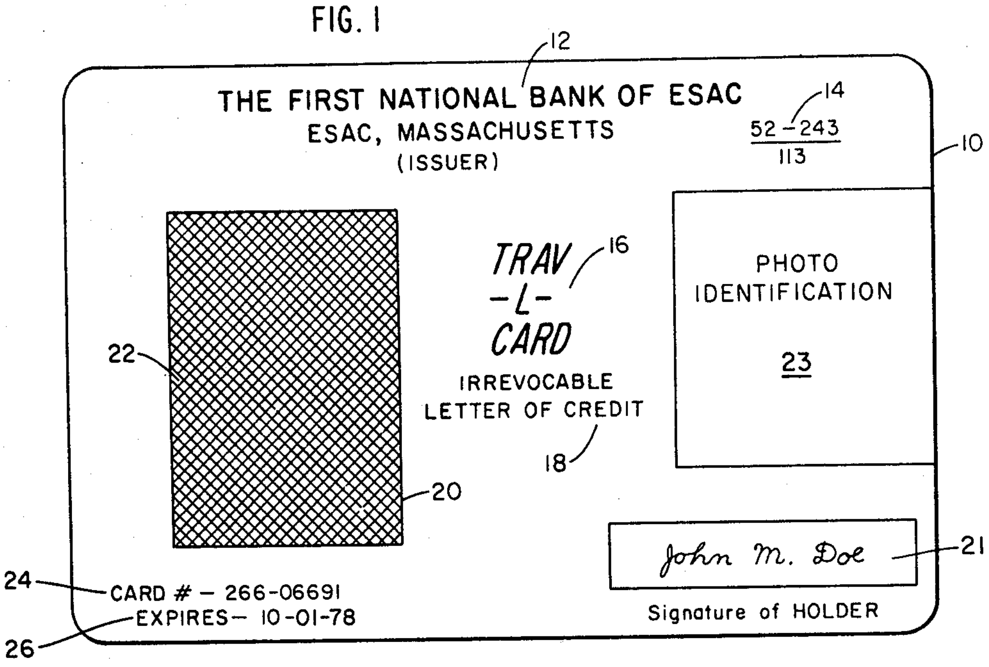
FIG. 3
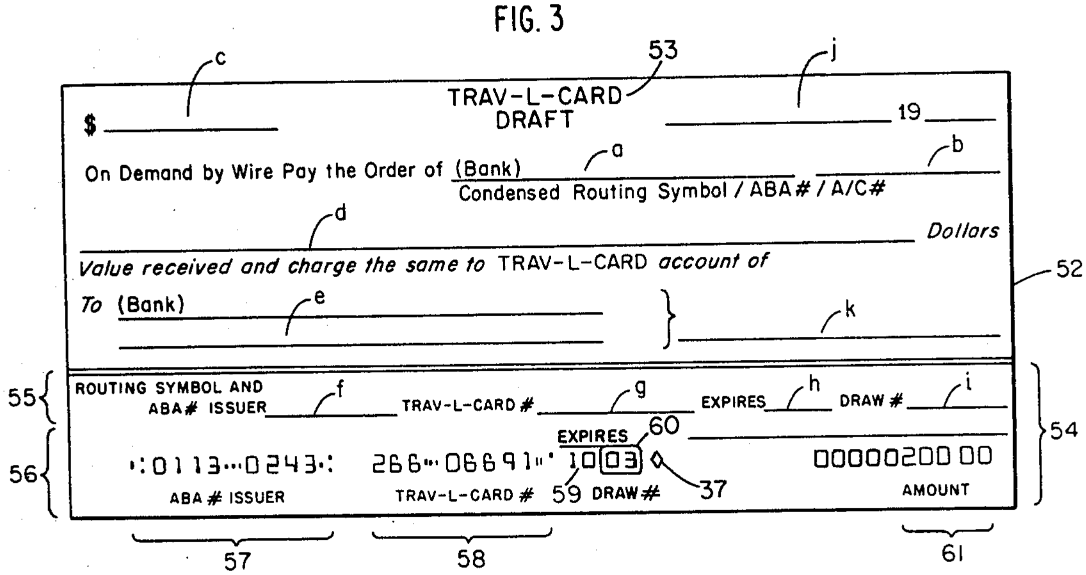
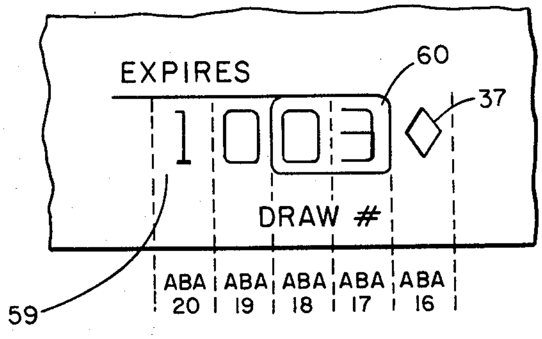
FIG. 3a

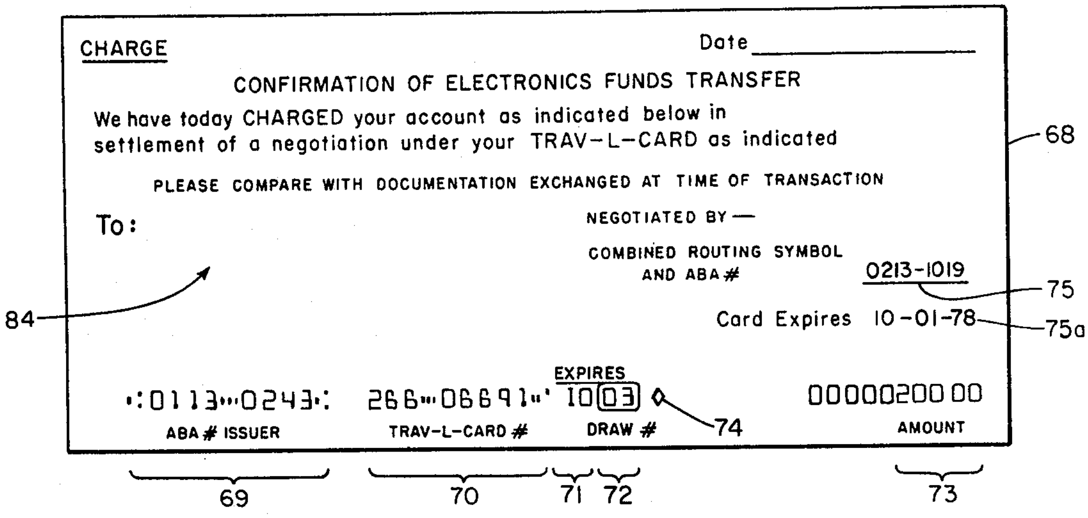

FIG. 4

CHARGE                                                          Date _____

CONFIRMATION OF ELECTRONICS FUNDS TRANSFER

We have today CHARGED your account as indicated below in
settlement of a negotiation under your TRAV-L-CARD as indicated

PLEASE COMPARE WITH DOCUMENTATION EXCHANGED AT TIME OF TRANSACTION

To:                                          NEGOTIATED BY —
                                             COMBINED ROUTING SYMBOL
                                                     AND ABA #        0213-1019

Card Expires   10-01-78

EXPIRES
⑈0113⑈0243⑈:   266⑈06691⑈'  10 [03]             00000200 00
   ABA # ISSUER       TRAV-L-CARD #    DRAW #                AMOUNT 69              70         71  72                     73

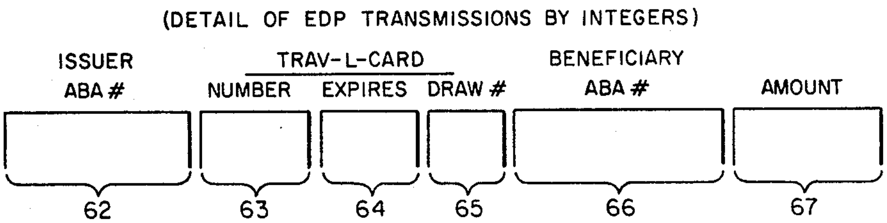

FIG. 5

(DETAIL OF EDP TRANSMISSIONS BY INTEGERS)

| ISSUER<br>ABA # | TRAV-L-CARD | | | BENEFICIARY<br>ABA # | AMOUNT |
|---|---|---|---|---|---|
| | NUMBER | EXPIRES | DRAW # | | |
| 62 | 63 | 64 | 65 | 66 | 67 |

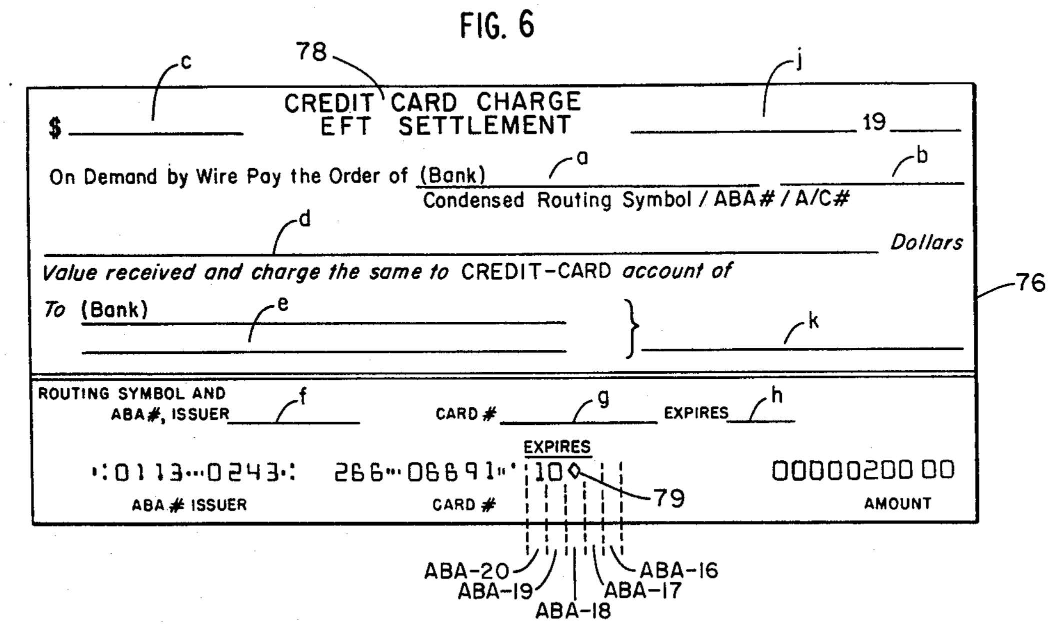

FIG. 6

78
              CREDIT CARD CHARGE                                  j
$ _____       EFT SETTLEMENT                 _____ 19 _____ a                              b
On Demand by Wire Pay the Order of (Bank) _____       _____
                                              Condensed Routing Symbol / ABA # / A/C #
                    d
_____ Dollars
Value received and charge the same to CREDIT-CARD account of To (Bank)      e
          _____                    }    k ROUTING SYMBOL AND    f                                h
     ABA #, ISSUER _____        CARD # ___g____  EXPIRES ___

EXPIRES
⑈0113⑈0243⑈:   266⑈06691⑈'  10 ◇                00000200 00
   ABA # ISSUER        CARD #          79                    AMOUNT

ABA-20     ABA-16
                                ABA-19   ABA-17
                                  ABA-18

ELECTRONIC FUNDS TRANSFER SYSTEM

This is a continuation-in-part of my prior application Ser. No. 820,633 filed Aug. 1, 1977 entitled "ELECTRONIC FUNDS TRANSFER DEVICE" now abandoned.

BACKGROUND OF THE INVENTION

In order to enable authorized signers on accounts to make fund transfers when distant from their bank's effective operating area, a territory which presently generally encompasses the limited range of telephone or computer link-ups, various services have been provided by means of such instrumentalities as credit cards, debit cards, traveller's checks, traveller's letters of credit and bankers drafts drawn on banking correspondents. Such instrumentalities, while providing desirable services and advantages, nevertheless suffer from a number of drawbacks and inconveniences both to the financial institutions and to the holders of such instrumentalities. None of them offer facilities for the account holder to negotiate a drawing on an electronic funds transfer (EFT) or routine encashment basis sufficiently secure to obviate the inconvenience and considerable expense of verification activities and other uncertainties, concurrent with effecting the negotiation, leading to transactions that cannot be completed, and delays.

The present invention has, as a principal objective, the providing of a novel system including a card type letter of credit device which, when used in combination with a novel draft, and a novel confirmation ticket bearing a unique transaction code, dictates the nature of any one of a number of accounting devices. One of such devices makes possible a set of financial procedures whereby the holder of such a device may conduct a negotiation on a letter of credit EFT basis, on which he has signing authority, with secure guarantees to the negotiating party that settlement of the transaction will be carried out expeditiously. The system may also include other types of fund transfer devices, such as credit card charges, and the like, each designed to operate within the system and providing alternative financial procedures with the same advantages as outlined above. In addition, such a new system provides a complete and current set of data to the holder, the issuer bank and the beneficiary bank, which data represents a duplicate record of that which is recorded on books of the issuer, and shows to both the negotiating party and the holder, the same details which are available to the issuer.

SUMMARY OF THE INVENTION

The invention comprises an Electronic Funds Transfer (EFT) system including a number of uniquely designed instruments. The first is a letter of credit card provided with an arrangement of punch-out elements or other machine readable data which designate the amount of each transaction. The second is a draft form which, at the time of the transaction, is provided with data identifying the card holder, the amount involved in the transaction and a punch-out or other machine readable element which, by its predetermined location on the draft, identifies it as a draft on which clearance at the office of the beneficiary is to be initiated on an EFT basis. The system includes machine reading elements which, in response to the detection of said punch-out by the bank of first handling, causes all of the machine readable data to be automatically numerically encoded, transmitted to and recorded at a clearing agent. The system involves instrumentalities at the clearing agent which will automatically feed the data into the agents' established clearance processing system to be entered in to the appropriate clearance accounts and automatically retransmit such data to the issuer. The message to the issuer will have identified the transaction represented by the draft as an EFT item. The system also includes a novel debit ticket at the issuer's office. The issuer also is equipped with a standard type of message receiving equipment which, when triggered by the signal identifying the transaction as an EFT item, will automatically print the data of the message along its bottom edge of the ticket in machine readable form. The ticket is also provided along such edge with a punch-out, or other machine readable element, at the same predetermined location as the punch-out or machine readable item on the original draft. The presence of such element will be detected by the issuers equipment and the ticket will be fed into the electronic data processing (EDP) equipment at the issuer to be cleared through the proper letter of credit account on the books of the issuer before ultimate and final charge to the holder's account.

The system is also capable of effectuating such EFT clearances for other instrumentalities such as credit card charges and the like.

BRIEF DESCRIPTION OF THE DRAWINGS

FIG. 1 is an obverse view of the novel electronic funds transfer card device;

FIG. 3 is an obverse view of the novel draft used in combination with the card of FIGS. 1 and 2;

FIG. **3*a* is an enlargement of a portion of the lower edge of the draft of FIG. 3**;

FIG. 4 is an obverse view of a debit or charge ticket to an individual account on books of an issuer bank for terminal EFT settlement.

FIG. 5 is a flow chart summary of the electronic data processing transmissions and information involved in an EFT settlement made possible by the present invention;

FIG. 6 is an obverse view of a revised form of a debit or charge ticket which may be used when a credit card transaction is to be processed in the system.

Figure 7:
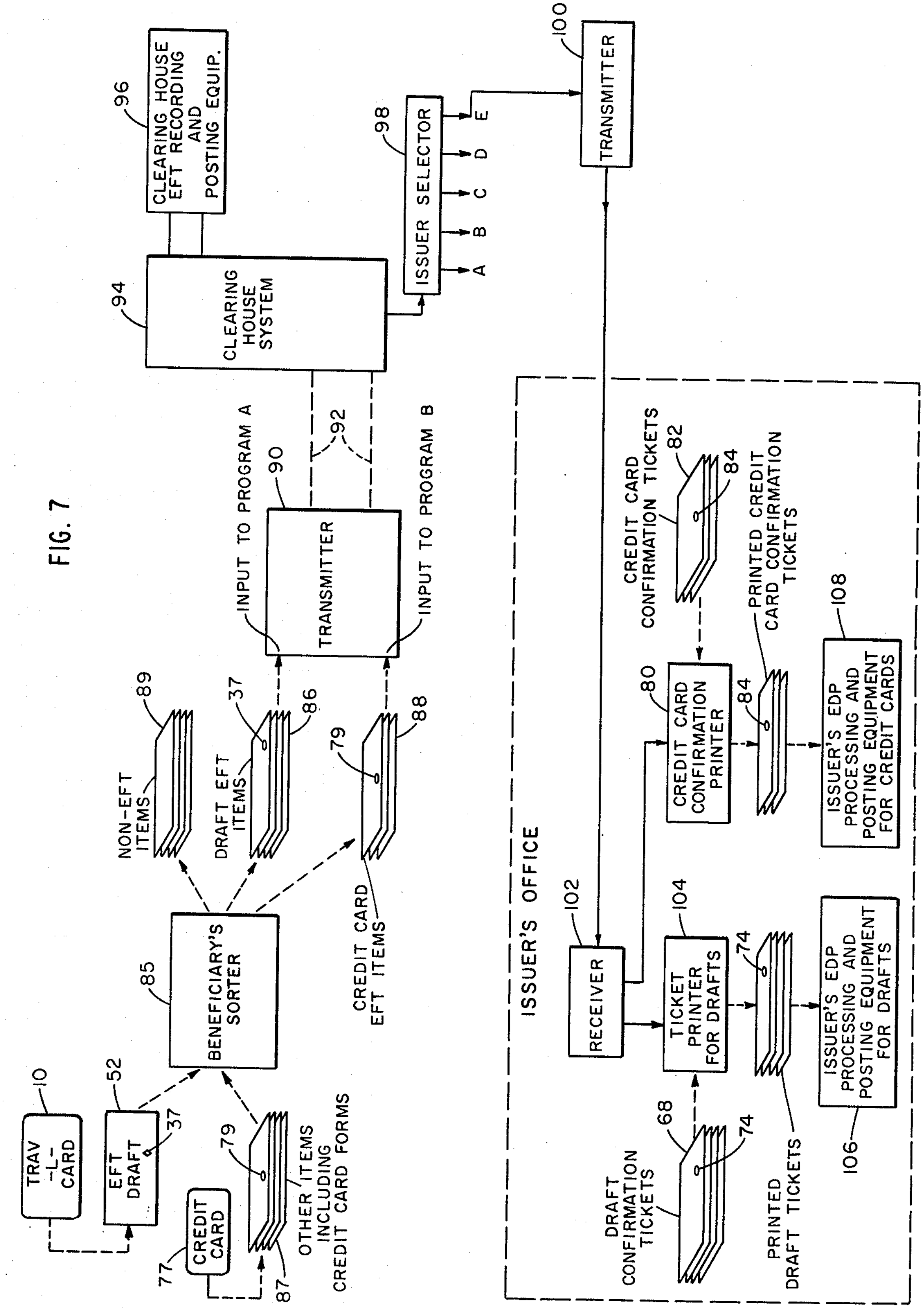

FIG. 7 is a diagrammatic representation of the overall system of the present invention for processing both drafts and credit cards.

DETAILED DESCRIPTION OF THE PREFERRED EMBODIMENTS

In the drawings, 10 is a flat card of some tough durable material, such as plastic, of a size to fit conveniently into a standard wallet. In this respect, it is similar to the usual plastic credit card. It is imprinted on its face with an identification 12 of the name and location on the issuer, the fractional ABA (American Bankers Association) routing number for the issuer 14, a characteristic trade name 16 for the card, and an identification 18 of the nature of the card. One portion of the face of card 10 is coated with a relatively thin lamina 20 of frangible material bearing any suitable medallion design 22 upon its surface in order that any fracturing of the lamina 20 will become irrevocably apparent.

At the time the card is issued, its face is permanently embossed with a card account number 24 assigned by the issuer to the holder of the card. It is an important part of this device that such number be identical with that of the checking account, if any, on which the holder is the signer. At the same time, an expiration date 26, not further than eleven months ahead, which always includes the first day of a month and year, will be given to the card, and such date will also be embossed on the face of the card. This fact that such date is not later than eleven months is important in enabling two integers to perform the function of six—i.e., a "10" for example at 71 on FIG. 4 translates on an EDP handling basis to 10-01-78 at 75a on FIG. 4, which in turn corresponds with 26 of FIG. 1.

A strip 21 bearing the signature of holder is also affixed to the face of the card and is preferably laminated onto the card with a transparent plastic layer covering the signature so as to preserve its integrity. For further identification a photograph of the holder may be laminated onto the surface of the card at 23.

Figure 2:
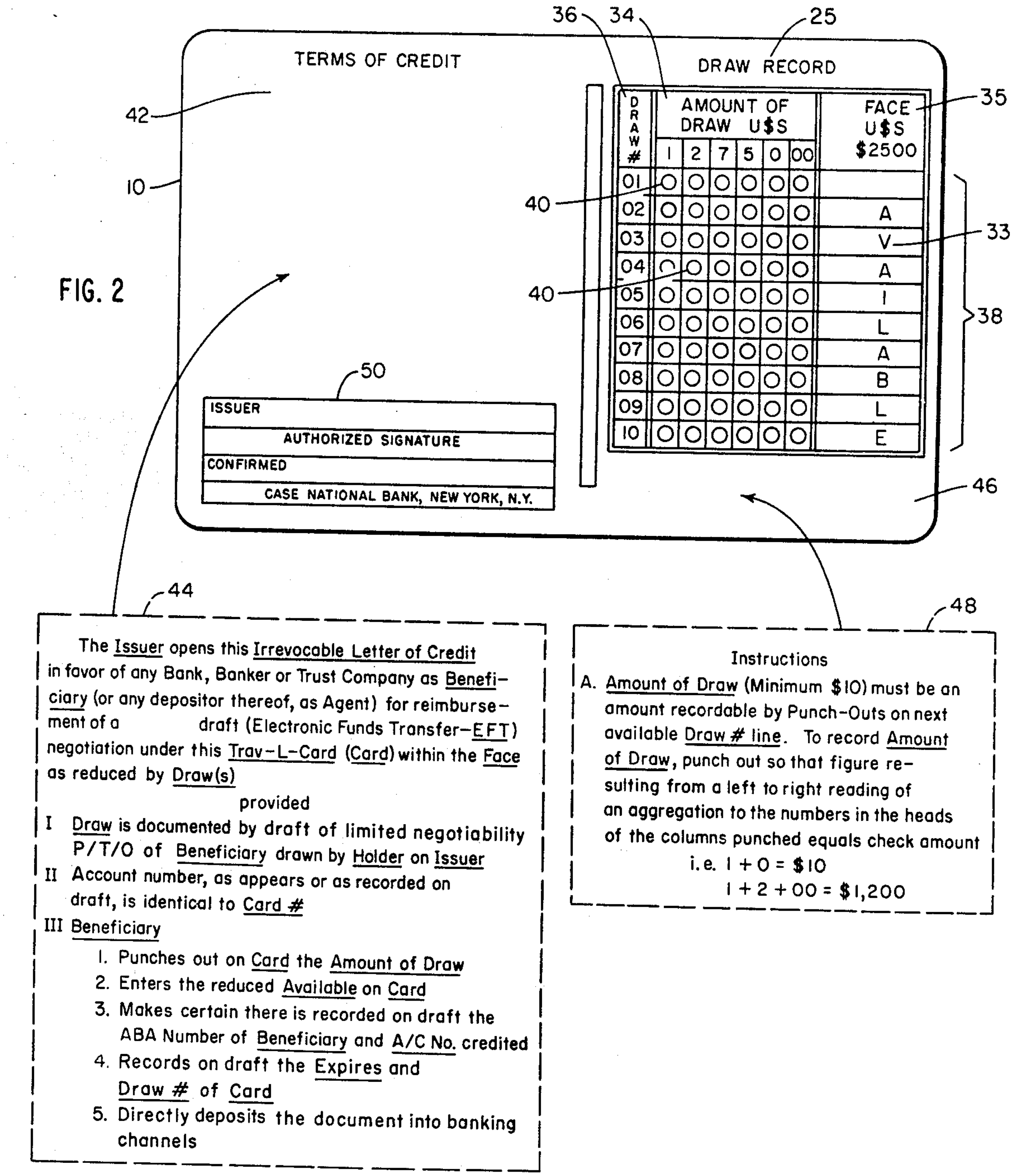
FIG. 2 is a view of the reverse side of the card device of FIG. 1.

The operative portion of the card is illustrated in FIG. 2 which shows the reverse side of the card of FIG. 1. This consists principally of the DRAW RECORD section 25. Along the top right hand portion 35 of section 25 is imprinted, preferably by embossing, the total number of dollars initially available to be drawn or negotiated under the card. Such amount may be characterized as "FACE U$S 2500." Along the top central portion of section 25, and spanning a number of vertical columns, is a portion 34, entitled "AMOUNT OF DRAW *U$S." Each of the columns under portion 34 is headed by a distinctive numeral. As illustrated, the left hand column is headed by the numeral "1," the next column by "2," the next column by "7," the next column by "5," the next column by a "0," and the extreme right hand column by "00." This arrangement of numerals, as will be explained below, provides a simple and very compact arrangement for the recording of each of the amounts drawn by each negotiation under the card. At the top of the left hand portion of section 25 is a column 36 headed by the designation "DRAW #." Extending transversely across the section 25 under all of its headings are a plurality of draw transactions 38, numbered typically from 1 to 10. Each portion 38, where it subtends a column of portion 34, is provided with a punch-out element 40. While such a punch-out element may take various forms, it preferably consists of a circular disc area of the card 10 which is scored around its perimeter so as to leave but a thin portion which is readily broken away be pressing on the disc by any suitable pointed instrument. It will further be noted that the medallion imprinted lamina 20 directly underlies the punch-out portions of the "DRAW RECORD" 25 so that each removal of a punch-out element 40 will rupture the lamina 20 and this produce an irrevocable indication of each such punch-out action. Where each draw transaction portion 38 extends below portion 25, such portion 38 is provided with a basically blank surface with a faint background printing of the word "AVAILABLE" 33 upon which the negotiating party must enter in ink a reduced amount in accordance with instructions appearing on the card, as will be explained below.

As shown in FIG. 2, to the left of "DRAW RECORD" 25, is a "TERMS OF CREDIT" section 42, on which is imprinted the details of the terms under which the beneficiary will be reimbursed by the issuer bank for any sums paid to the holder of the card by the negotiating party. For clarity of illustration, a typical set of such terms as they appear on the card are set forth in the block 44 below the illustration of card 10 in FIG. 2.

A section 46, below the "DRAW RECORD" section 25 has imprinted upon it a set of "INSTRUCTIONS," which also for the sake of clarity, are set forth in the block 48 below the illustration of card 10 in FIG. 2.

In a manner similar to that described for the signature strip 21 of FIG. 1, the reverse side of card 10, as shown in FIG. 2, is provided with a signature strip 50 both for the signature of an authorized agent of the issuer, and that of a confirming bank, or of a joint bank financial entity set up to develop universal acceptance through uniformity.

The advantage of the particular configuration of the "AMOUNT OF DRAW U$S" portion 34, and the columns within it, will become apparent from an examination of the "INSTRUCTIONS" portion 48.

In examining the INSTRUCTIONS in portion 48 it will be seen that, in the example illustrated in FIG. 2, any sequence of punched out numerals in the four left hand columns, when read in their left to right reading, will be multiplied by ten if the "0" column is punched out; by one hundred, if the "00" column is punched out; and by one thousand if both the "0" and the "00" columns are punched out. This compact arrangement thus makes possible the recording of any sum which would normally be negotiated under the provisions of the card.

As will be indicated below, the principal use of the card is in combination with a novel form of restricted negotiable draft 52 as shown in FIG. 3. The main body of the draft contains a title 53 which identifies it as a draft to be used in combination with the card as shown in FIGS. 1 and 2. In addition the main body of the draft contains a number of portions to be filled in at the time of the execution of the transaction. Such portions will be described in detail later below. The draft 52 is provided along its lower edge with a strip 54 divided into an upper portion 55, and a lower portion 56 which is not detachable and always forms part of the document. Strip 56 of the draft may be either preprinted or printed at point of transaction in magnetic ink with certain information in the generally accepted common machine language known as the "Magnetic Ink Character Recognition" program, usually referred to as MICR. The spaces allocated to such information are in conformity with the American Bankers Association's established space allocation standards. Starting at the left end of strip 56, the block 57 of twelve spaces contains the American Bankers Association condensed mandatory routing symbol for the issuer. The next block 58 contains the mandatory digit number symbols for the checking account number, identical in this case, with the number of the card against which the draft is drawn. The next block 59 of two spaces, which under the selected space allocation standards is available for optional use, contains the number of the month on which the card involved expires, which is always expressed by a minimum of two integers with a single digit month such as January coded "01." This is followed by a block 60 of two spaces which, under said standards is also available for optional use, contains the draw number, also always expressed by a minimum of two integers in column 36. In the next space, also optionally available under said standards, is a punch-out element 37, which designates that the subsequent handling is to be by EFT. In essence, at the time of the transaction, all of the essential elements of the transaction are recorded on the draft in numeric description so that all subsequent handling of the transaction can be completed on an EFT basis. The five spaces occupied by the blocks 59, 60 and the punch-out 37 will be referred to hereinafter as "ABA standards optional spaces." It is to be understood that any other convenient space standards might be used instead of the ABA standards. The right hand end of strip 56 comprise a block of ten spaces, mandatory under said standards for the amount of the transaction, and on which the dollar amount of the transaction is, by universal procedure, encoded at 61 in MICR at the first bank handling, the transaction figure having been visually derived from c and d on the draft 52. It is also technically possible for the beneficiary to machine print, at the time of the transaction, the data in blocks 59, 60 and 61 in MICR.

For convenience of the beneficiary at the time of negotiation, and where necessary to facilitate ease of subsequent MICR encoding also at first handling, strip 55 has spaces adjacent to blocks 57–60 for hand posting of integer details of each of the blocks. Such details, for example, read respectively "Routing Symbol and ABA # Issuer;" "Trav-L-Card #;" "Expires" and "Draw #."

The draft 52 is usually prepunched at 37 to insure that it will thereafter initiate an EFT transaction. The manner in which the draft is to be treated is detailed in blocks 44 and 48 as shown in FIG. 2, and in general, the negotiator of the beneficiary proceeds as follows. He initially verifies the identify of the holder by the photograph at 23. The negotiator examines the punch-out history of the card and verifies that the balance available for payment to the holder is sufficient to include the amount of the draft as requested by the holder. Usually it is expected that the holder will have filled out strip 55. At negotiation, the negotiator checks to see that this has been done or else he completes strip 55 himself. He also writes the account number if any to be credited on the books of the beneficiary at blank b, the amount of the draw, as requested by the holder in figures at blank c and in writing at d, the name of the issuer at blank 3, the date of the transaction at j. He then has the holder sign the draft at blank k. To the extent that the information which he is required to write on portion 55 has been preprinted in portion 56, he need only make visual confirmation of such information by matching it with card 10. The negotiator then records the amount of the draft on the card by punching out the requisite punch-outs 40, and enters the correct reduced "Available" amount on the corresponding draw number line. After verifying the identify of the signature of the holder k, with that appearing on the card at 21 he pays the holder the amount of the draft in cash or in any other form as requested by the holder. The original of the draft is retained by the beneficiary to initiate subsequent EDP processing and one copy given to the holder.

When the beneficiary at first handling, has completed the magnetic ink encoding on the draft, the draft, with the punch-out 37 plus an additional device at the issuer, which will be described below, makes it possible to handle all subsequent steps in settlement of the transaction to be carried out on an EFT basis without any intervening manual recording and without any physical transfer of paper between beneficiary and issuer.

To effectuate such a settlement the beneficiary will use the system as diagrammed in FIG. 7. He will be provided with a standard type of sorter 85 into which he will feed draft 52 together with all other documents on which he desires to perform settlement operations, either in batchs or at the end of each business day. All drafts which are identified by a punch-out, such as 37 on draft 52 to be subject to EFT clearance, will be segregated into a pile at 86 and all non-EFT items will be segregated into another pile or piles at 89. Where the system is adapted to process credit cards charges by EFT clearance, certain credit card charge tickets 87 will be segregated in a pile 88 as will be explained below, and all non-EFT items will be segregated in another pile 89. Such segregation results from the sorter automatically detecting the presence of a punch-out at the predetermined space allocated by the system to such punch-out in one of the ABA standards optional spaces.

The beneficiary will, at selected operating intervals, initiate the first of a number, or numbers, of EDP transmissions by feeding the pile of documents 86 into his transmitter 90 and transmitting data by tested wires 92 to and from a receiver at the clearing house 94 of a clearing agent or agent. Where desired such data may first be accumulated in memory banks from which such transmitted may occur. Where the system is dealing only with drafts, the transmitter 90 is provided with a single program (A) which, recognizing from the presence and position of punch-out 37 that the uniquely designed draft 52 is involved, will read all of the machine readable data from which it will generate the proper message transmission to be read by the receiving equipment at clearing house 94. The data segments involved in such transmissions are charted in FIG. 5. The first segment 62 contains the issuer ABA number which appears at 57 on the draft 52. The next segments 63, 64 and 65 contain the card number, its expiration date and the draw number, all as they appear respectively at 58, 59 and 60 on the draft. Segment 66 is allocated to the beneficiary's ABA number, which the beneficiary will usually transmit separately at the head of its EDP transmission of an accumulation of all items in pile 86 which the beneficiary wishes to be settled in the same batch by the clearing agent. The final segment 67 contains the amount of the draw as it has been recorded in MICR figures at 61 on the draft. When the draft, which has been described above, is fed into the EDP system, each of the data segments 62 through 67 of FIG. 5 will automatically be read and recorded in equipment 96 at the clearing agent's office.

The clearing agent's office will be provided with a standard type of equipment 98 which will automatically distribute and segregate, by its ABA number, all items which have been wired from various banks to be transmitted to a particular issuer. The clearing agent's equipment will automatically add the beneficiary's ABA number to each item which it has received from a beneficiary and which has been segregated to be transmitted to an issuer. Such transmission will be sent by the clearing agent's standard transmitter 100 to a receiver 102 at the issuer's office. An EDP transmission from the clearing agent to each issuer ABA number will be headed by the issuer's ABA number and each item in the message will contain the data in segments 63, 64, 65, 66 and 67.

In order to complete the novel system of this invention, the issuer will be equipped with a novel debit or confirmation ticket 68 as shown for example in FIG. 4. A supply of these debit tickets will be stored in the message receiving equipment at the issuer's office. The bottom portion of the ticket will be reserved for the magnetic ink printing to enable it to be processed by standard EDP equipment. Preferably each ticket is preprinted at segment 69 with the issuer's ABA number, although such prerecording of this information at the issuer's office is purely optional. The message receiving equipment at the issuer's office will be provided with a printer 104 to print the data of segment 63 (FIG. 5) as the card number at segment 70 (FIG. 4); the data of segment 64 (FIG. 5) as the "Expires" at 71 (FIG. 4) and also infull at 75*a;* the data of segment 65 (FIG. 5) at 72 (FIG. 4); the beneficiary ABA # in segment 75 (FIG. 4) from the data in segment 66 (FIG. 5); and the data of segment 67 (FIG. 5) as the amount in segment 73 (FIG. 4). The ticket 68 is also provided with a space 84 for a programmed electronic printing of the name and address, as it appears on the records of the issuer, of the authorized holder to whom the credit involved has been issued. The ticket 68 is also preferably prepunched with a perforation 74 along the bottom of ticket 68 in the same optional use location of the accepted Magnetic Encoding Standards of the Bank Commission of the American Bankers Association as punch-out 37 on draft 52 (FIG. 3). This perforation is clearly readable, either visually by the issuer's employees, or automatically by any standard EDP or optical scanning device. Thus, perforation 74 insures that the debit ticket 68, after it has been printed with the magnetic ink data, as described above, will be fed into the EDP processing equipment 106 at the issuer and will clear through a letter of credit account on the books of the issuer before ultimate and final charge to the holder's account.

The message received from the clearing agent will have identified the beneficiary as noted above, and the EDP procedure at the issuer's office will have credited the account of the clearing agent. The same information will permit the combined routing signal and ABA number of the beneficiary to be entered on the ticket 68 at location 75 on an EDP basis.

After being cleared through the books of the issuer, the ticket 68 is transmitted to the holder in regular course of the submission of the usual periodic statements sent to the holder.

As described above the elements of the information printed or punched along the lower edges of the draft of FIG. 3 and the ticket of FIG. 4 are located in spaces allocated in conformity with the American Bankers Association established space allocation standards. Those standards have assigned identifying numbers to each of them. Under such numbering, the spaces occupied by blocks 59, 60, and 37 in FIG. 3 are optionally available under such standards. The ABA space allocation standards has given specific numbers to all of the spaces in the allocation. Under such numbering the spaces occupied by blocks 37, 60, and 59 respectively are given as "ABA 16" through "ABA 20." This relationship is illustrated in FIG. 3*a* in which the ABA assigned space numbers are shown for each of the identified spaces. Under the system of this invention, a document tagged at space "ABA 16" with a punch out (e.g., as 37 in FIG. 3) is automatically coded as a draft to be processed as an EFT transaction.

The above description of space allocation in FIG. 3, also applies to FIG. 4.

As contrasted with prior systems, in the present invention the data on the card 10 is a duplicate record with the card holder of the data as recorded on the books of the issuer as soon as the negotiated draft has been processed as described above. In addition the card presents both to the negotiating party and to the holder the same details as are available to the issuer. All of this makes possible a wide variety of new accounting and financial procedures, limited only by the ingenuity of the accounting personnel involved, which will yield substantial profit advantages to all of the parties involved.

As previously indicated the system of this invention may be adopted to handle a variety of financial transactions on a purely EFT basis. One of such transactions might be a settlement of a credit card charge transaction. Any form of credit card 77 (FIG. 7) could be used which, as a minimum, would contain an identification of the issuer, the holder, the card number and its expiration date. The beneficiary would be supplied with a novel form of credit card charge ticket 76 as shown in FIG. 6, which, in general, is based upon the same principles as the draft of FIG. 3. In the modification 76, the title of the ticket is charged to identify it as a credit-card charge and other reference to a "draft" is changed to "credit card." In the case of the credit card, moreover, the ticket would be modified as indicated at the lower edge of ticket 76. In this instance the "EXPIRES" data is placed in the ABA standards allocation spaces "ABA 19" and "ABA 20," while a punch-out 79 is located in ABA standards allocation space "ABA 18," instead of in space "ABA 16" as in the case of punch-out 37 for draft 52. Also spaces "ABA 16" and "ABA 17" could be left blank. In all other respects, the significance of the entries on ticket 76 is the same as for similar items in draft 52. The provision of the blank spaces "ABA 16" and "ABA 17" provides means whereby additional data, such as that requiring prior authorization of the amount of the transaction being above any prescribed limit, could be encoded in such spaces. The location of punch-out 79 in a different ABA optional space from that of punch-out 37, serves as a position identification of ticket 76 as being a credit card charge ticket. To process a credit card transaction through the system, the beneficiary would proceed to fill out the credit card charge ticket 76 from the data on credit card 77 (FIG. 7) in the same way as had been described for filling out draft 52. In this case, the beneficiary's sorter is programmed to detect the predetermined position of punch-out 79 and to segregate all such credit card charge tickets in a separate pile 88 of credit card charges as indicated in FIG. 7. Also since the position of the "EXPIRES" data in the ABA optional spaces is different from the position of similar data on the draft 52, transmitter 90 is provided with another program (B) into which the tickets 88 are fed so as to properly identify and transmit the data with the proper integers in segments 62 through 67 of the transmissions represented in FIG. 5.

As in the case of the draft 52, the information will be received, recorded and posted in accordance with the standard clearing house system and the information, in turn, is relayed to the appropriate issuer. At the head of the message transmitting the credit card data to the issuer, the clearing agent will insert an identification that the message is one dealing with the issuer's credit card system. Such identification will trigger the receiver 102 at the issuer's office to feed the information into a separate credit card confirmation printer 80. The issuer will also be provided with a separate supply of credit card confirmation tickets 82, as shown in FIG. 7. Such confirmation tickets 82 will differ from the draft confirmation tickets 68 in the same way as credit card charge tickets 76 differ from draft 52. Therefore confirmation tickets 82 will be provided with a punch-out 84 in the same ABA optional space "ABA 18," as occupied by punch-out 79 on credit card charge ticket 76.

The presence of punch-out 84, in its unique position and ticket 82; insures that such ticket, after it has been printed with magnetic ink in the same manner as described for ticket 68; will be fed into EDP processing equipment 108 and will clear through to said credit card accounts on the books of the issuer. After such clearance, the credit card holder will be supplied on a delayed billing basis with the usual periodic statements of the amounts which he owes to the issuer under his credit card account.

EXAMPLES OF VARIATION

As in the case of credit cards EFT settlements, advantage can be taken of the fact that the arrangement of the data within the ABA standards optional spaces need not be identical with that shown in FIG. 3*a*. The beneficiary would be able to prepare information transmission documents similar to the draft 52 with the punch-out 37 located in any one of the optional spaces "ABA 16" through "ABA 20" and, by its position, the punch-out could be used to identify four different kinds of formal transactions in addition to the letter of credit card 10. The data in the other four optional spaces in FIG. 3*a* could be arranged in the four spaces not occupied by the punch-out 37. Thus, as described above, one of said punch-out positions could be used to identify the transaction as a credit card transaction, another as a traveller's check negotiation, etc. The system equipment would be made to detect the particular position of the punch-out and to sort out the information documents in accordance with the type of transaction involved. The information could then be transferred on an EFT basis in each case with an identification of the type of transaction involved.

In the case of punch-out operation in FIG. 2, the integers used in the left hand columns of position 34 need not be necessarily those shown, since other integers might be used from which the magnitude of the draw could be derived.

A punch-out in the card does not necessarily require a portion of the card to be removed. Any fracturing or irrevocable distortion of the card at the punch-out areas might well serve the same purpose, such as alterations effected in magnetic ink symbols. The preservation of the security of the other data on the card might also be accomplished by means other than specifically described above.

Although, in the above example, the beneficiary is described at 42 and 44, as a "Bank, Banker or Trust Company," the invention as indicated in 44, FIG. 2 may be applied with respect to other parties negotiating the grant of credit under the card particularly where settlement is on an EFT basis. The intention would be, after a period of marketing and resultant acceptance, to expand the card's use to include beneficiaries of a non-bank status. The Terms of Credit 44 as set forth in FIG. 2 provide for this ultimate use, by the proper entry at b in FIG. 3.

Instead of punch-out elements other types of machine readable printed symbols might be used.

Various other modifications within the scope of the appended claims will suggest themselves to those skilled in the art.

What is claimed:

1. An electronic funds transfer (EFT) system adapted to carry out a credit transaction under a credit instrument provided with data defining the issuer and holder of said instrument and constituting authorization for the holder to conduct credit transactions under said instrument said system comprising:

(a) a charge ticket to be completed by the beneficiary of the transaction at the time of said transaction, said ticket bearing machine readable data identifying the instrument holder, his account at the issuer, the amount of the transaction, the issuer and a machine readable element located at a predetermined optional standards position on said ticket, said last named machine readable element defining the ticket to be cleared on an EFT basis;

(b) sorting means at the beneficiary's location for segregating said ticket as an EFT item in response to the detection of said last named machine readable element;

(c) a message transmitter;

(d) means for transferring said segregated ticket to said message transmitter;

(e) said message transmitter being adapted to read the machine readable data from the segregated ticket and transmit to a clearing house receiver, as a separate message for each said ticket, all of said data together with an identification of the beneficiary and a designation of the transmission as an EFT item;

(f) said clearing house receiver being adapted to segregate each such separate message in accordance with the identification of the issuer and for delivering said separate message to a transmitter connected to a receiver at said issuer;

(g) a printer at said issuer, said printer containing a blank confirmation ticket having a machine readable element in the same predetermined standards optional position as the corresponding machine readable element on said charge ticket;

(h) said printer being connected to the output of said last named receiver and being adapted to print on said confirmation ticket all of the data delivered to it by said receiver; and (i) means for delivering each printed confirmation ticket to electronic data processing equipment which is adapted to detect the presence and position of said last named machine readable elements and, in response to said detection to clear said confirmation ticket respectively through and to the proper credit accounts on the books of the issuer.

2. A system as in claim 1 which is adapted to carry out credit transactions under a plurality of different kinds of credit instruments; said system also including:

(a) charge ticket for each of said kinds of credit instrument having its machine readable element located in a different predetermined optional standards position for each different kind of credit instrument;

(b) said sorting means also being adapted to segregate said charge tickets into different categories on a basis of the kind of credit instrument involved in response to the predetermined position of said machine readable element assigned to the kind of credit instrument involved;

(c) the transmitting means also being adapted to transmit the identification of the kind of credit instrument involved in each transmission;

(d) the confirmation ticket for each kind of credit instrument having its machine readable element located in the same predetermined standards optional position as the corresponding machine readable element on the corresponding charge ticket.

3. A system as in claim 1 in which each of said machine readable elements comprises a punch-out.

* * * * *